United States Patent [19]

Anton

[11] 3,955,204

[45] May 4, 1976

[54] THERMOELECTRIC MATRIX PRINTING HEAD

[75] Inventor: Rainer Anton, Nurnberg, Germany

[73] Assignee: Triumph Werke Nurnberg A.G., Nurnberg, Germany

[22] Filed: Sept. 25, 1974

[21] Appl. No.: 509,091

[30] Foreign Application Priority Data

Oct. 24, 1973 Germany .......................... 2353182

[52] U.S. Cl. .............................. 346/139 C; 29/592; 174/72 B; 197/1 R

[51] Int. Cl.² .......................................... G01D 15/06

[58] Field of Search ...................... 346/139 C, 76 R; 29/592, 624; 174/72 B, 117 FF; 197/1 R

[56] References Cited

UNITED STATES PATENTS

| | | | |
|---|---|---|---|
| 3,185,761 | 5/1965 | McHugh | 174/72 X |
| 3,235,942 | 2/1966 | Howell et al. | 29/592 |
| 3,708,609 | 1/1973 | Iosue et al. | 174/72 B |
| 3,718,936 | 2/1973 | Rice | 346/139 C X |
| 3,719,261 | 3/1973 | Heinzer et al. | 197/1 R |
| 3,744,611 | 7/1973 | Montanari et al. | 197/1 R |
| 3,857,470 | 12/1974 | Bastard et al. | 197/1 R |

*Primary Examiner*—Joseph W. Hartary
*Attorney, Agent, or Firm*—Arthur Gershman

[57] ABSTRACT

A matrix printing head for use in a thermoelectric printing process has a plurality of electrical conductors which are fixed in predetermined relationship to one another. The conductors are disposed in a plurality of plates, and the plates are fixed in predetermined relationship to each other to form a matrix of electrical conductors. The plates may be made of an electrically conductive material and have insulating slots cut completely through the plates to form the conductors. The plates are then stacked, sandwich fashion, with a layer of insulating material between each plate. The plates and layers may be pinned to insure accurate alignment, and an adhesive is applied to the surfaces of the plates and insulating layers. The stack is then compressed and the ends of the conductors are exposed to provide a printing surface at one end and leads for the electrical connection of means to activate selected conductors at the other end.

8 Claims, 3 Drawing Figures

THERMOELECTRIC MATRIX PRINTING HEAD

BACKGROUND OF THE INVENTION

This invention relates to matrix printing heads for use in type printers in data terminals, typewriters, bookkeeping and other office and similar machines using the "thermoelectric" printing method wherein electrically conductive printing ink is transferred to a record carrier by applying an electrical potential gradient to preselected positions on a carrier of the printing ink.

U.S. patent application Ser. No. 493,205 of Rainer Anton and Reinholt Gebhardt filed July 31, 1974, discloses a method of and apparatus for impactless or non-mechanical printing. This method and apparatus uses an electrically conductive ink, a screen-like carrier for the ink, a record carrier and two electrodes to impress an electric potential gradient across the ink. One of these electrodes, known as the printing head, is capable of imposing an electrical potential gradient having a preselected configuration, generally an alphanumeric character. When a preselected character is to be printed, the printing head impresses an electrical potential gradient having the configuration of the character between the head and the screen electrode, to form a current path across the ink carrier and through the electrically conductive ink. This current path may either generate a joulean heat through the conductive ink, which will soften or locally liquefy the ink for transfer to the record carrier, or else may cause discharges between certain particles within the conductive ink to charge these particles and at the same time heat and soften surrounding particles so that the charged particles may be moved and/or accelerated by the electric field to transfer the ink to the record carrier. In either event, when an electric field of appropriate strength is impressed across the ink between the printing head and the screen electrode, a defined particle transport toward the screen electrode takes place. A record carrier, positioned at the outer surface of the screen electrode, absorbs the ink which passes through the screen electrode, thereby recording the preselected character.

It will be noted that the printing electrodes of the above-described method and apparatus do not provide electrostatic charges as do other electrical printing processes, but rather serve primarily to generate a current path or current flow through the conductive ink.

German disclosure No. 2,137,371 of Feb. 3, 1972, in the ICP Patent class G 06 K, 15/14, a "Method for the Manufacture of a Printing Head with Wire Printing Electrodes," describes a method for manufacturing electrostatic printing heads in which wire printing pins or electrodes are embedded in an adhesive to form a wire and adhesive foil, which is then disposed between two opposing end plates. In addition, a number of wire and adhesive foils may be disposed between the end plates to form a multilayered printing head. According to this method, closely spaced turns of wire are wound on a revolving drum and become embedded in an adhesive carrier which has been applied to the drum. The cylinder which is thus formed is split open, removed from the drum and spread out to form a flat foil, whose wire side is then brought in contact with and bonded to an epoxy resin end plate.

Printing heads made by this method are claimed to have many advantages over previous printing heads for use in electrostatic printers of recording, registering and measuring instruments. These heads, it is claimed, are more durable, cheaper to produce, increase the printing electrode density, produce heads of greater strength than heretofore produced, and provide better control over the electrode spacing and changes in dimension of the electrodes.

It has been found, however, that printing heads manufactured by the above-described method offer no advantages when used as impactless thermoelectric printing heads according to the method and apparatus described in the aforementioned U.S. application Ser. No. 493,205. In printing according to the impactless thermoelectric method, due to the basic difference in the phenomenon employed, the density of the electrodes in the head or matrix is much less significant than the accurate adjustment of the electrodes within the matrix and their matrix position relative to the screen electrode and ink carrier. To insure proper transfer of the ink to the record carrier it is desirable that the grid pattern of the screen electrode be dimensioned such that a single conductor of the printing head is located symmetrically or centrally behind one or more associated mesh openings. While the dimensions of the grid pattern of the screen electrode may match those of the printing head conductor matrix, this is not necessary to comply with the requirement stated above.

Thus, the wound wire method of making heads as described in German disclosure No. 2,137,371 is inappropriate to produce thermoelectric matrix printing heads, since the grid pattern of the electrodes produced by winding wire on a drum cannot be sufficiently accurately controlled, and the use of wire for electrodes, and wire and adhesive foil for a matrix similarly cannot produce a matrix of sufficient dimensional accuracy. On the other hand, manufacturing steps and techniques which would be inappropriate in making the wound wire head may be used in making the thermoelectric matrix printing head. Thus, to effectively employ the "thermoelectric" impactless printing process, a need exists for a printing head and for a method of making a printing head which is dimensionally accurate and repeatable and which is inexpensive and efficient to manufacture.

SUMMARY OF THE INVENTION

Briefly, the invention of apparatus for and a method of making a matrix thermoelectric printing head comprises fixing a plurality of electrical conductors in predetermined relationship with one another so that the conductor ends can be disposed at one surface of an expanse of electrically conductive ink to assist in generating an electrical potential gradient at a selected surface location on the expanse of ink, thereby transferring the ink to a record carrier. This may be done by fabricating a plurality of plates each having a plurality of electrical conductors disposed therein in a predetermined relationship to one another, and fixing said plates in a predetermined configuration to form a matrix of electrical conductors whereby the matrix may be used to apply the electrical potential gradient. One means of carrying out the invention is to fabricate electrically conductive plates provided with machined or etched out slots forming a plurality of electrically insulated conductors, and then to build a stack in sandwich fashion by alternating a conductive plate with a layer of insulation. The plates may be pinned to accurately position the conductors in the stack. The stack is then compressed and fixed, either by an adhesive or by external pressure in a predetermined configuration to form a matrix. The input and output terminations of the matrix are then exposed by removing any excess material in the conductive plates or insulating layers and the matrix of electrically insulated conductors may then be used to apply an electrical potential gradient to preselected positions on a carrier of electrically conductive ink.

OBJECTS OF THE INVENTION

An object of the invention is to fabricate a thermoelectric printing head having the electrical conductors disposed therein in an accurately predetermined matrix configuration.

Another object of the invention is to fabricate the above-described thermoelectric printing head in an inexpensive and efficient manner.

Yet another object of the invention is to effectively utilize the thermoelectric impactless printing method and apparatus by providing a matrix printing head in which electrical conductors disposed therein are accurately positioned in a predetermined matrix configuration.

A still further object of the invention is to effectively utilize the thermoelectric impactless printing method apparatus by providing a matrix printing head which is inexpensive and efficient to manufacture.

Other objects and many of the attendant advantages of this invention will be readily appreciated as the same becomes better understood by reference to the following detailed description when considered in connection with the accompanying drawing in which like reference characters designate like parts and primed reference characters designate equivalent parts throughout the Figures thereof and wherein:

DETAILED DESCRIPTION OF THE INVENTION

Figure 1:
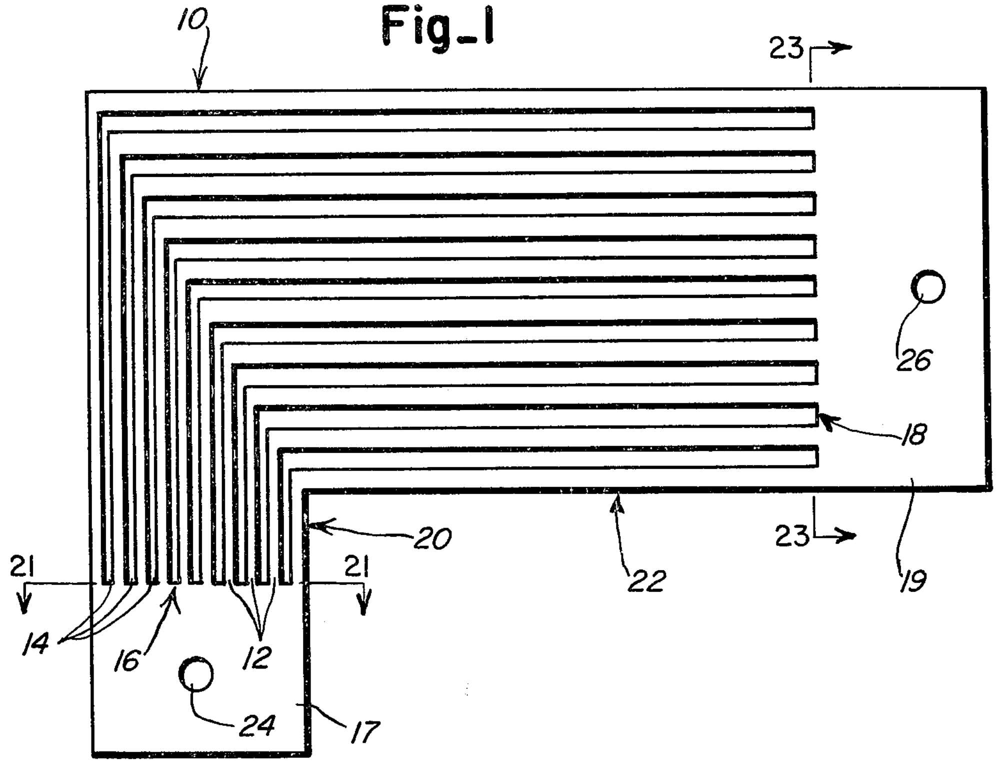
FIG. 1 is a top view of a plate having a plurality of conductors disposed therein in accordance with the invention.

The invention of a thermoelectric matrix printing head has, as one means of fixing a plurality of conductors in a predetermined relationship to one another, a plate, one embodiment of which is illustrated in FIG. 1, generally designated by numeral 10. Plate 10 is made of an electrically conductive material and has a plurality of electrical conductors 12 disposed therein in fixed relationship to one another. Electrical conductors 12 are separated and, when the printing head is fully fabricated, insulated from each other by insulating strips 14 which in the embodiment of FIG. 1 are slots which have been cut completely through plate 12 by etching, electrode forming (galvanoplastic), laser or electron beam machining, by a thick or thin film technique, or by other suitable material removing processes. It should be noted that when etching is used to produce insulating strips 14 and to define conductors 12, the absolute dimensions of conductors and the spacing which determines electrode density are not critical in fabricating a matrix printing head for use in a thermoelectric printing process or apparatus, as previously explained. By using plates in which slots have been cut, however, the predetermined relationship between the conductors is maintained, thus making it possible to fabricate a printing head which will be useful in carrying out the impactless thermoelectric printing process.

In the embodiment of FIG. 1 conductors 12 are provided with two distinct orthogonally-disposed portions 20 and 22, one portion being narrower than the other. The narrower portion 20 of conductors 12 terminates in output ends 16 and the wider portion 22 terminates in input ends 18. Output ends 16, when the matrix printing head is completely fabricated, will serve as one of the printing electrodes to generate an electrical potential gradient across the electrically conductive ink of the thermoelectric impactless printing process and apparatus. Input ends 18, when the printing head is fully fabricated will serve as electrical connections to connect conductors 12 to means such as a decoder to activate selected conductors to generate an electric signal of a preselected configuration, generally an alphanumeric character. By use of narrower portion 20 and wider portion 22, the density of output termination 16 at the printing surface may be increased while still providing input ends 18 with sufficient surface area to insure convenient electrical connections. Narrower portion 20 and wider portion 22 are not confined to an orthogonally-disposed rectangular configuration as shown in FIG. 1, but may take any convenient form, such as a fan shape, consistent with the scope of the invention. Plate 10 is provided with excess portions 17 and 19 for ease in fabricating conductors 12. When fully fabricated, excess portions 17 and 19 are removed, at lines 21 and 23, isolating conductors 12 and insulating them from one another. Plate 10 is provided with alignment openings 24 and 26 so that successively overlying plates may be accurately aligned to provide a matrix of predetermined configuration.

Figure 2:
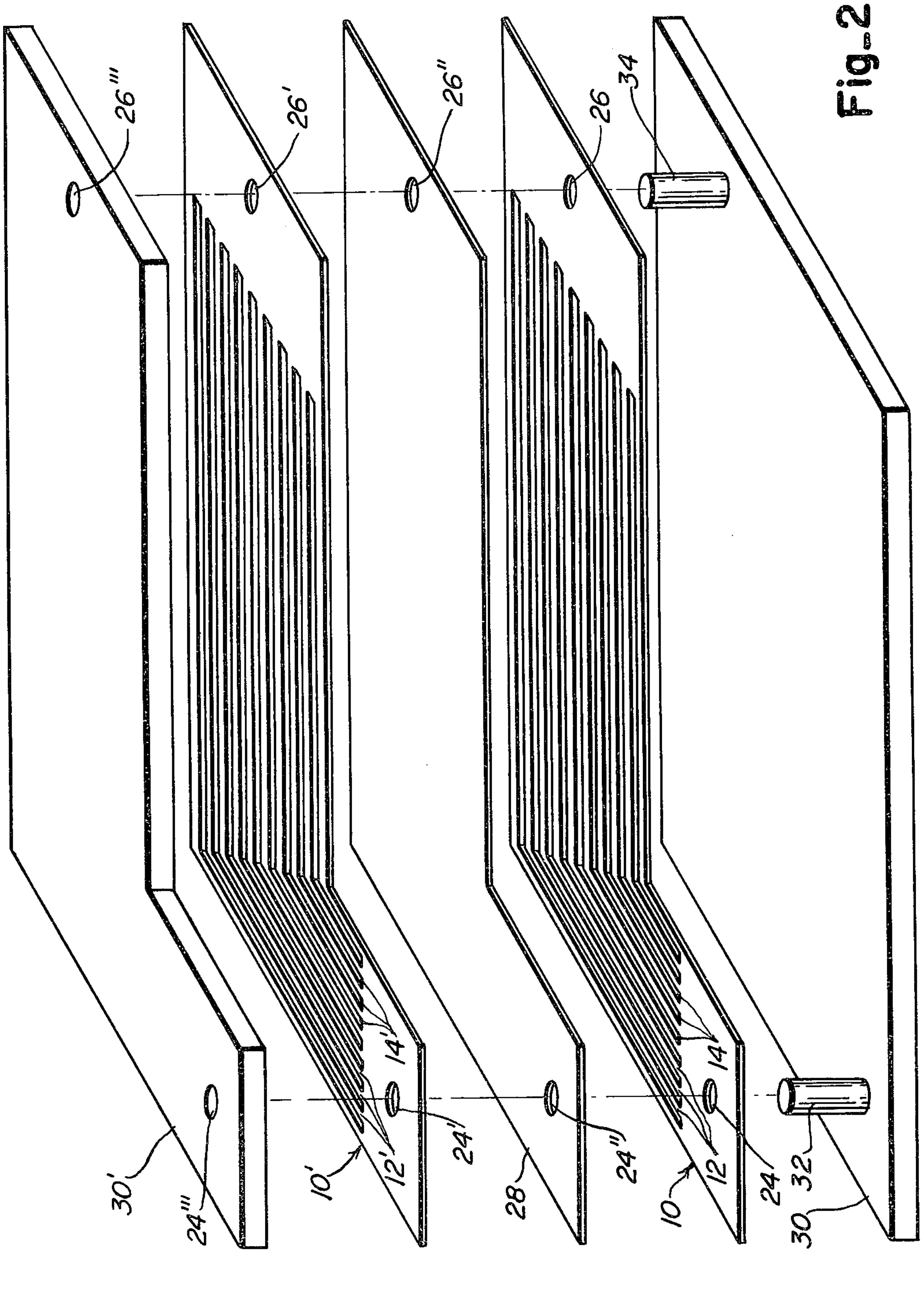
FIG. 2 is an exploded view of one embodiment of the invention showing a plurality of plates, an insulating layer and opposing end plates stacked in sandwich fashion.

Referring to FIG. 2, a plurality of plates 10 and 10′ are shown, plate 10′ overlying plate 10 and separated by insulating layer 28 in sandwich fashion. Insulating layer 28 may be in sheet or foil form. End plates 30 and 30′ are placed below plate 10 and above plate 10′ respectively, in opposing relationship, to fabricate the stack. Alignment openings 24—24′′′ and 26—26′′′ are provided in plates 10 and 10′, insulating layer 28 and end plate 30′. Dowel pins 32 and 34, together with alignment openings 24—24′′′ and 26—26′′′ provide means for aligning plates 10 and 10′ and insulating layer 28 in predetermined relationship with one another and insure that conductors 12 and 12′ will also be aligned in the stack in predetermined relationship to one another.

In assembling the stack of FIG. 2, external pressure is applied to opposing end plates 30 and 30′ to firmly compress plates 10 and 10′ and insulating layer 28 between the two end plates. An adhesive may be applied to each or any of the surfaces of plates 10, 10′ and layer 28 to assist in fixing or bonding these components. The adhesive may be any convenient adhesive, such as a synthetic epoxy resin or the like, which will withstand the temperatures generated during compacting.

Figure 3:
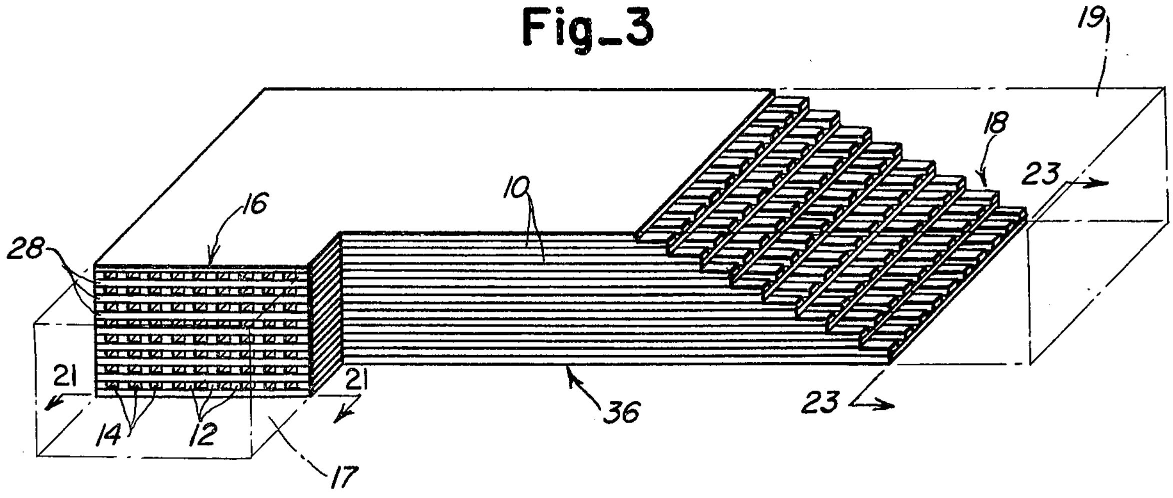
FIG. 3 is a perspective view of one embodiment of the invention showing the matrix of conductors fixed in predetermined relationships to one another to form a completely fabricated matrix printing head.

Referring to FIG. 3, a completely fabricated matrix printing head 36 which has been made from a stack similar to that of FIG. 2 is shown. Electrical conductors 12 are fixed in predetermined relationship with one another, and are electrically insulated by insulating strips 14 and insulating layers 28. Each of the plates 10, and each of the insulating layers 28 have been compressed and fixed or bonded as described above. To protect the completely fabricated printing head, the head may be given a jacket by immersion, spraying, extrusion or similar known processes. The jacket may also serve to give the printing head a desired shape and may also provide additional external pressure to fix the components.

After bonding, output ends 16 and input ends 18 of conductors 12 are exposed by removing excess portions 17 and 19 (shown in phantom in FIG. 3) at lines 21 and 23 as by machining, eroding or other suitable methods. Output ends 16, as previously described, will serve as one of the printing electrodes to generate an electrical potential gradient across the electrically conductive ink of the thermoelectric impactless printing apparatus. Output ends 16 have, therefore, been formed as by lapping, polishing or gold plating to provide a smooth, level surface for the passage of other components of the printing apparatus. The conductors 12 must have properties which assure good contact and the least possible transfer resistance while being resistant to mechanical wear and to spark erosion caused by printing malfunction, for example, sparking due to a momentary loss of contact with a flat ribbon element. Conductors 12 may be fabricated from, for example, beryllium - copper sheet, nickel, or similar metals or metal alloys. Conductors 12 should also be suitable for the application of gold or a suitable contact material, if required.

Input ends 18 of conductors 12, as previously described, will serve to connect conductors 12 and to means such as a decoder to activate selected conductors to generate an electric signal of a preselected configuration, generally an alphanumeric character, and therefore have been exposed to form a stair-like arrangement to provide convenient electrical leads. This may be done by machining, erosion or other suitable methods.

Thus, a thermoelectric printing head has been provided which has a plurality of electrical conductors disposed in fixed relationship to one another in a matrix whereby the matrix may be used to apply an electrical potential gradient to preselected positions on a carrier of electrically conductive ink.

I claim:

1. A thermoelectric printing head of the type having printing electrodes for use in a thermoelectric printing process wherein an electrical potential gradient is applied between said printing electrodes positioned at the surface of an expanse of a printing medium containing electrically conductive ink and a counter electrode located on the other side of said printing medium comprising:

a rectangular matrix of precisely spaced printing electrodes for the passage thereagainst of said printing medium wherein said printing electrodes are made by, cutting slots in a plurality of conductive plates to form a plurality of identical plates each having a number of precisely spaced conductive strips, said strips being electrically and physically joined by an excess portion of said plates and said strips forming at one end a number of printing electrodes and at the other end a number of connecting terminals, stacking said identical plates in alignment, each plate being separated by an imperforate insulating layer of predetermined thickness, fixing said stacked plates so that the conductive strips in successive layers are precisely spaced apart, severing said fixed stacked plates and layers from said excess plate portion to electrically isolate said conductors and to form said rectangular matrix.

2. The printing head of claim 1, wherein an adhesive is applied to said conductive plates and insulating layers to fix said conductors in a predetermined relationship to one another.

3. The printing head of claim 2, wherein each of said conductors comprises two orthogonally disposed conductive legs.

4. The printing head of claim 3, wherein one end of each of said electrical conductors is exposed to form a smooth surface adapted for the passage of the printing medium and the other end of each of the electrical conductors is exposed to form a stair-like arrangement adapted to be connected to means to activate selected conductors.

5. A method of making a printing head of the type used in a thermoelectric printing process wherein an electrical potential gradient is applied between a plurality of printing electrodes positioned at a selected surface location of an expanse of a printing medium containing electrically conductive ink and a counter electrode positioned on the other side of the expanse wherein said method of making the printing head comprises cutting slots in a plurality of conductive plates to form a plurality of identical plates each having a number of precisely spaced conductive strips, said strips being electrically and physically joined by an excess portion of said plates and said strips forming at one end a number of printing electrodes and at the other end a number of connecting terminals, stacking said identical plates in alignment, each plate being separated by an imperforate insulating layer of predetermined thickness, fixing said stacked plates and layers so that the conductive strips in successive layers are precisely spaced apart, severing said fixed stacked plates and layers from said excess plate portion to electrically isolate said conductors and to form a planar rectangular matrix of precisely spaced printing electrodes for the passage thereagainst of said printing medium.

6. The method of claim 5, wherein said conductors are fixed in a predetermined relationship to one another by applying an adhesive to said conductive plates and said insulating layers.

7. The method of claim 6, wherein each of said conductors is fabricated to comprise two orthogonally disposed conductive legs.

8. The method of claim 7, further comprising exposing one end of each of the electrical conductors to form a smooth surface adapted for the passage of the printing medium and exposing the other end of each of the electrical conductors to form a stair-like arrangement adapted to be connected to means to activate selected conductors.

* * * * *